Feb. 17, 1948.  H. M. CADOT ET AL  2,436,355
SPRAY DRYING DIMETHYLOLUREA
Filed June 5, 1946
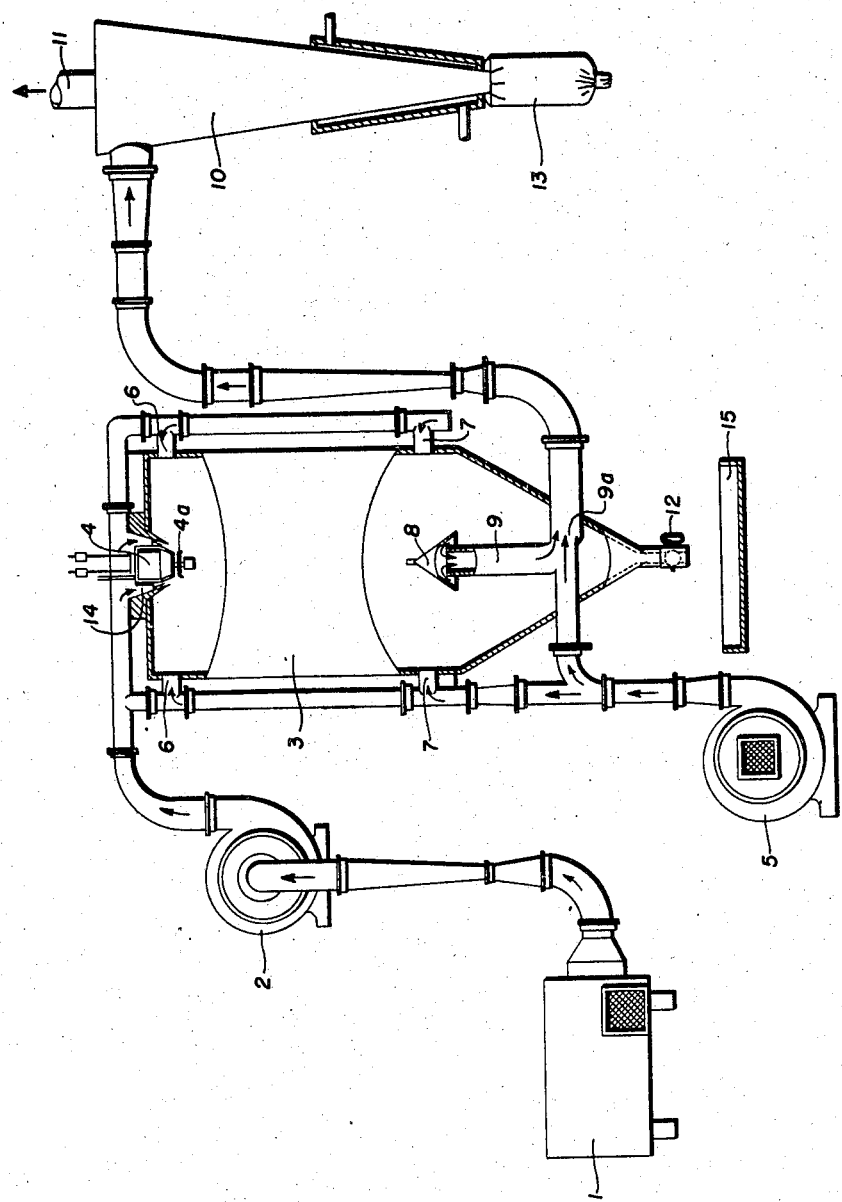
Henry M. Cadot
William B. Clark  INVENTORS
BY
ATTORNEY

UNITED STATES PATENT OFFICE 2,436,355

SPRAY DRYING DIMETHYLOLUREA

Henry M. Cadot, Greenville, and William B. Clark, Wilmington, Del., assignors to E. I. du Pont de Nemours & Company, Wilmington, Del., a corporation of Delaware Application June 5, 1946, Serial No. 674,617

9 Claims. (Cl. 260—553)

This invention relates to a process for the economical production of dry, stable dimethylolurea and more particularly to an improved process of obtaining such a product by spray drying.

It is known that urea and formaldehyde react exothermically in water to form simple addition compounds. Under certain circumstances the reaction proceeds further to give resinous substances. In the absence of resinification, the reaction is reversible, the formation of dimethylolurea being represented by this equation.

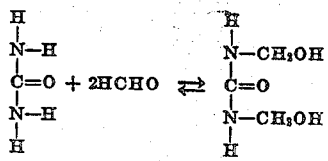

The reaction rate is dependent largely upon the pH of the solution and to a lesser extent upon the temperature and concentration. High temperatures, acid pH or strongly alkaline pH speed the reaction but also induce resinification so that if no resin formation is desired, consideration must be given to both effects when choosing reaction conditions. Furthermore, dissociation of dimethylolurea to urea and formaldehyde, is favored by high temperatures so that the final reaction temperature should be low to obtain highest conversion.

Full compliance with proper conditions gives a product, essentially dimethylolurea, containing appreciable quantities of water which tends to render the product less stable, i. e., a product that does not remain water-soluble when stored at normal temperatures. As the dry product is much more stable it is most advantageous to convert the wet product to the dry, more stable form. Due to the instability of dimethylolurea at only slightly elevated temperatures considerable difficulty has been encountered in attempts made to dry it. Spray-drying offers the possibility of evaporating the water while subjecting the dimethylolurea to elevated temperature for only a brief moment. However, it has been found that unless the urea-formaldehyde addition product is prepared in a particular form and unless a specially designed spray-drier is employed, the spray-dried product adheres tenaciously to inside surfaces of the spray-tower and ductwork so that it cannot be readily discharged before it overheats and forms undesirable products.

An object of the present invention is to provide a process for obtaining dry dimethylolurea powder of good stability. Another object of the invention is to convert the reaction product of urea and formaldehyde to a form which upon spray drying give a water-soluble, very stable dimethylolurea substantially free from water-insoluble substances. Still another object is to provide conditions of temperature and pH such that substantially no resinous substances are formed before or after spray drying. A further object is to provide an aqueous solution of dimethylolurea which gives a free flowing powder upon spray drying. A further object of the invention is to prepare the addition product of about two moles of formaldehyde and about one mole of urea in a form which is spray driable. Other objects and advantages of the invention will hereinafter appear.

According to the findings on which the application is based, the spray-drying of dimethylolurea is made possible by preparing it in a form which will, upon losing moisture, solidify rapidly in the drier to a non-sticky powder. The conditions under which dimethylolurea is synthesized from urea and formaldehyde have an important bearing upon its suitability for spray-drying. Products obtained from the condensation of urea with formaldehyde have been spray dried but these products have been made by effecting the condensation reaction under such conditions that the monomeric dimethylolurea first formed is polymerized prior to spray drying. The urea-formaldehyde condensation reaction has been conducted under alkaline and acid pH conditions but in either event the product was not, as initially formed, in such a condition that it could be successfully spray dried. By adjusting the pH of the product to the acid side and heating after adjustment, or by heating the product of the reaction carried out on the acid side, products were obtained which could be spray dried. The heating step under acid conditions results in polymerization giving not monomeric dimethylolurea but polymers thereof.

In contradistinction to such processes, applicants have provided a process whereby the urea-formaldehyde condensation is conducted wholly under alkaline conditions and the product spray dried is likewise under alkaline conditions such that substantially no polymeric forms of the dimethylolurea are produced. Consequently applicants have provided for the first time a spray dried dimethylolurea in monomeric form. This is of considerable importance for when this product is used in subsequent reactions it is essential to know for accurate control of ultimate product composition what form the dimethylolurea is in. The products of the prior art, due to treatment under acid conditions are not monomeric products and cannot, therefore, be considered pure chemical compounds but on the contrary are polymeric materials of, by and large, indeterminable composition. Applicants' product is monomeric dimethylolurea, a chemical entity which will act as such when used in chemical reactions, while the products of the art not being chemical entities and because of their resinous nature being of an indeterminate composition, cannot be converted to other products with any assurance as to the composition obtained.

Generally speaking the invention involves conducting the condensation of formaldehyde and urea while the solution is alkaline in order that polymer formation is inhibited, conditioning the product for spray drying and then spray drying.

According to this process then, it is important inter alia to synthesize dimethylolurea under conditions which will avoid resinification and which will permit as complete reaction as possible between the urea and formaldehyde thereby giving high melting point products. Any process for synthesizing dimethylolurea which will meet these conditions may be used such as the following:

F/U [1] mole ratio, 1.90–2.20, preferably 2.05.
pH, 7.0–9.0, preferably 8.0.
Temperature, below 90° C., preferably below 50° C.
Reaction time, dependent upon temp., preferably 6 hrs.
Buffer concentration, 0.0001–0.01 part by wt./part of formaldehyde, preferably 0.001 part by wt./part of formaldehyde.
Suitable buffers, boric acid, triethanol amine, "Triton B," tetraethylol ammonium hydroxide.

In order to obtain a sufficiently high melting product (low melting point products being difficultly sprayable) it is important to observe synthesis conditions which will permit essentially complete reaction. The presence of unreacted formaldehyde in the feed to the drier has been found to result in lower melting product, presumably because of the increased solubility of dimethylolurea in the residual formaldehyde-water mixture. The presence of unreacted urea or monomethylolurea in the dimethylolurea feed has been found to result also in a lower-melting product. The proportion of formaldehyde to urea in the original reaction mixture must, for successful spray drying, be controlled to give as little unreacted urea and formaldehyde in the final product as possible.

To speed the reaction, high temperatures may be used for short periods. In a continuous synthesis process where it was possible to heat and cool rapidly, dimethylolurea synthesized successfully without noticeable resinification using initial conditions of 80° C. for 20 minutes. Lower temperatures could be used for longer periods. Batchwise synthesis under initial conditions of 65° C. for 1 hour was also successfully carried out to give a dimethylolurea solution which, after further treatment, could be spray-dried. Synthesis at lower temperatures for longer periods is preferred because the resulting product is more stable, but not because it can be spray-dried more readily.

The solution of formaldehyde and urea is initially brought to the desired pH by the addition of an alkali metal or an alkaline earth metal hydroxide or carbonate. The reaction between the formaldehyde and urea, for optimum production of spray-driable dimethylolurea requires a temperature below 50° C., and a reaction time of from 4 to 6 hours to give yields in the order of 90% or more of the urea and formaldehyde to dimethylolurea. As an example of a preferred method of preparation, 200 pounds of 37% formaldehyde buffered with 33.6 grams of boric acid and adjusted to a pH of about 8.0 with 150 cc. of 10% sodium hydroxide are reacted with 72 pounds of crystal urea at a temperature below 45° C. Heat may be applied during the reaction if necessary.

In a simplified process involving synthesis in the presence of excess formaldehyde, removal of most of the excess formaldehyde by flash distillation, and crystallization to a slurry, the crystallization period can be used to effect additional conversion. Thus, a reaction mixture having a formaldehyde to urea mole ratio of only slightly more than 2.0 and containing 30%–60% water can be reacted adiabatically under the previously described conditions until more than 90% of the urea and formaldehyde have been converted to dimethylolurea; the reaction mixture can then be cooled below 35° C. at which temperature additional reaction will take place slowly. After a period of about 8 hours at 35° C. less than 3.7% and preferably less than 2½% of the original formaldehyde based on the weight of dimethylolurea is unreacted and the resulting slurry can be spray-dried.

A principal feature of the invention, which may be characterized as conditioning of the product, resulting in the production of dry stable dimethylolurea involves cooling the product adjusted to a pH between 7 and 9 and preferably below 8.5 from the urea-formaldehyde reaction to a temperature below 50° C. and preferably below 35° C. for at least 0.5 hour although it may be held below this temperature for up to about 20 hours and preferably 3 to 6 hours are used. This cooling results in a crystallization or separation of some of the dimethylolurea from the solution giving a slurry containing in the order of about 53% or more dimethylolurea. At the end of the crystallization the pH is adjusted to between 7.0 and 7.5 and preferably to a pH of about 7.2 with an inorganic acid such, for example, as sulfuric acid, hydrochloric acid, phosphoric acid, or the like, an 85% phosphoric acid solution is particularly recommended and the thus prepared slurry then spray-dried. This pH adjustment is for improvement in the stability of the final product. In so far as spray-drying is concerned this adjustment is not essential.

The distinguishing features of a spray-drier preferred for drying dimethylolurea is that all surfaces which the solid might contact are cooled below ca. 55° C. Higher temperatures than this are required in the main body of the spray-tower in order to remove all but a few percent (less than 5%) moisture. In the spray-tower where air flow is stream-lined this may be accomplished by introducing cold air tangentially to the walls. In the ductwork where air flow is turbulent, sufficient cold air may be mixed with the exhaust air from the tower to reduce the temperature below ca. 55° C. Ideally the temperature of the dimethylolurea does not rise even to 55° C. since the water is evaporated at the wet bulb temperature of the drying air (ca. 40°–45° C. under the conditions we used). In actual practice it is ---
[1] Formaldehyde/urea.

readily seen that the portion of product which contacts a hot surface may readily warm to the temperature of this surface.

Any suitable type of spray-drying apparatus may be employed having the aforesaid characteristics such as that illustrated in the accompanying drawing wherein air is drawn through heating chest 1 by means of hot air blower 2 and forced directly into the spray-drying chamber 3. A rapidly rotating disk sprayer 4 is provided at the top of this chamber; from the disk 4a at the bottom of which the slurry is atomized into the chamber. Auxiliary, cold air at a temperature below about 35° C. is fed to the chamber from cold air blower 5 which forces air through annular rings 6 and 7 at the top and bottom of spray chamber 3. Air is drawn from the chamber under the cone-shaped cap 8 through conduit 9. A positive flow of air from conduit 9 is provided by the cold air blower 5 which by means of a Venturi effect at 9a draws air from conduit 9 into the dust collector 10 from which the air is vented through orifice 11. A discharge damper 12 is provided at the bottom of the spray-drying chamber 3 for removal of the solids, while a fines bag 13 is provided at the bottom of the dust collector 10.

This spray-dryer operates by feeding the slurry prepared as described aforesaid into the centrifugally operated dispersing device 4. From the rapidly rotating plate 4a which revolves at a rate of from 5000 to 30,000 R. P. M., the slurry is sprayed into the top of the chamber. As a vertical cylinder about the spraying device 4 and through the annulus 14 hot air is blown directly against the dynamic sheet of dispersed slurry as it leaves the periphery of the rotating disk 4a. The impingement of hot air with the sheet rapidly dries the slurry which drops downwardly through chamber 3 and contacts the cold air from annular rings 6 and 7. The air is withdrawn as described through conduit 9. The dry particles of dimethylolurea collect in the conical bottom of the spray chamber and are intermittently or continuously removed through discharge damper 12 into a product tray 15.

While, as has been stated, any suitable spray drying apparatus may be used for converting the aqueous solution of dimethylolurea or the aforesaid slurry to a dry stable powder, the apparatus described above and illustrated by the drawing has been found to be especially well adapted for economically and efficiently accomplishing this result. The outstanding advantages of the apparatus reside in the direct contact of the hot air from blower 2 against the dynamic sheet of slurry as it is sprayed from the rotating disk 4a. It has been found that with a hot air temperature between 100 and 300° C. and preferably at about 200° C. and an exhaust air temperature from the drier of between 60 and 90° C. preferably 70° C. excellent and efficient drying is accomplished almost instantaneously. This apparatus gives a product, under normal operating conditions, containing less than 5% and usually less than 2% moisture.

In addition to rapid drying of the slurry to a powder it is essential also that the surfaces that the product might contact operate at a sufficiently low temprature to prevent product from adhering. To effect this result the spray chamber is provided with cold air ducts which admit air to the spray-drying chamber through the annular openings 6 and 7. An especially efficient and smooth operation of this device has been provided by so forming the annular openings at 6 and 7 that the air enters the chamber tangentially which results in a circulatory film of cold air insulating the vertical walls of the spray-drying chamber from the hot drying air. These features of the equipment play no small part in providing a commercially acceptable spray drying process for obtaining a dry stable dimethylolurea powder.

We claim:

1. A process for the preparation of dry stable dimethylolurea which comprises crystallizing dimethylolurea reaction products of formaldehyde and urea for at least 0.5 hour at a temperature from 35° to 50° C. and thereafter subjecting the resulting slurry to spray drying.

2. A process for the preparation of dry stable dimethylolurea which comprises forming an aqueous solution of dimethylolurea by reacting, at a temperature below 90° C., urea with an aqueous solution of formaldehyde, mol ratio of formaldehyde to urea being between 1.9 and 2.2, the solution prior to the reaction being adjusted to a pH between 7.0 and 9.0, thereafter crystallizing the reaction mixture while maintaining its pH between 7 and 9 at a temperature from 35° C. to 50° C. for at least 0.5 hour, subsequently spray drying the resulting slurry and immediately thereafter cooling the spray dried dimethylolurea.

3. A process for the preparation of dry stable dimethylolurea which comprises crystallizing a dimethylolurea reaction product of formaldehyde and urea at a pH between 7 and 9 for from 0.5 to 20 hours at a temperature from 35° C. to 50° C., thereafter subjecting the resulting slurry to spray drying and immediately thereafter cooling the spray dried dimethylolurea.

4. In a process for the preparation of dry stable dimethylolurea the steps which comprise crystallizing an aqueous solution of dimethylolurea adjusted to a pH between 7 and 9 at a temperature from 35° C. to 50° C. for between 0.5 and 20 hours, and thereafter spray drying the resulting slurry into a reaction zone wherein all surfaces contacting the dimethylolurea are cooled to a temperature below approximately 55° C.

5. In a process for the preparation of dry stable dimethylolurea, the step which comprises preparing a slurry containing about 53% dimethylolurea by crystallizing an aqueous solution thereof adjusted to a pH between 7 and 9 at a temperature from 35° C. to 50° C. for 0.5 to 20 hours and thereafter spray drying the resulting slurry by atomizing it into a zone wherein the sprayed product first comes into direct contact with drying air at a temperature between 100 and 300° C. and the drying air is insulated from the surface of the zone by a cold air film at a temperature below about 55° C.

6. In a process for the preparation of dry stable dimethylolurea, the step which comprises preparing a slurry containing about 53% dimethylolurea by crysallizing an aqueous solution thereof adjusted to a pH between 7 and 9 at a temperature from 35° C. to 50° C. for 0.5 to 20 hours and thereafter spray drying the resulting slurry by atomizing it into a zone wherein the sprayed product first comes into direct contact with air at a temperature between 100 and 300° C., all surfaces of the zone contacting the dimethylolurea being cooled to a temperature below approximately 55° C.

7. A process for the preparation of dry stable dimethylolurea which comprises crystallizing dimethylolurea reaction products of formaldehyde and urea, containing less than about 3.7% by weight of unreacted formaldehyde for at least 0.5 hour at a temperature from 35° to 50° C., thereafter subjecting the resulting slurry to spray drying and immediately thereafter cooling the spray dried dimethylolurea.

8. A process for the preparation of dry stable dimethylolurea which comprises crystallizing dimethylolurea reaction products of formaldehyde and urea, containing less than about 2.5% by weight of unreacted formaldehyde for at least 0.5 hour at a temperature from 35° to 50° C., thereafter subjecting the resulting slurry to spray drying and immediately thereafter cooling the spray dried dimethylolurea.

9. A process for the preparation of dry stable dimethylolurea which comprises forming an aqueous solution of dimethylolurea by reacting, at a temperature below 90° C., urea with an aqueous solution of formaldehyde, the mol ratio of formaldehyde to urea being between 1.9 and 2.2, the solution prior to the reaction being adjusted to a pH between 7.0 and 9.0, thereafter crystallizing the reaction mixture while maintaining its pH between 7.0 and 9.0 and at a temperature of about 35° C. for from 3 to 6 hours and subsequently spray drying the resulting slurry.

HENRY M. CADOT.
WILLIAM B. CLARK.

REFERENCES CITED

The following references are of record in the file of this patent:

UNITED STATES PATENTS

| Number | Name | Date |
| --- | --- | --- |
| 1,989,628 | Schmihing | Jan. 29, 1935 |
| 2,140,561 | Smidth | Dec. 20, 1938 |
| 2,187,877 | Ferris | Jan. 23, 1940 |
| 2,321,544 | Dittmar et al. | June 8, 1943 |